United States Patent
Sano

(10) Patent No.: US 8,693,024 B2
(45) Date of Patent: Apr. 8, 2014

(54) INFORMATION PROCESSING APPARATUS, COMPUTER READABLE MEDIUM STORING PROGRAM, AND INFORMATION PROCESSING METHOD

(75) Inventor: Yoshiyuki Sano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 305 days.

(21) Appl. No.: 13/187,087

(22) Filed: Jul. 20, 2011

(65) Prior Publication Data

US 2012/0243057 A1 Sep. 27, 2012

(30) Foreign Application Priority Data

Mar. 22, 2011 (JP) ................. 2011-062724

(51) Int. Cl.
*G06K 15/00* (2006.01)
*H04N 1/40* (2006.01)
*H04N 1/04* (2006.01)
*G06F 15/00* (2006.01)
*G06F 3/12* (2006.01)
*G06F 1/26* (2006.01)
*G06F 3/00* (2006.01)
*G01R 21/06* (2006.01)
*G05B 9/02* (2006.01)

(52) U.S. Cl.
USPC ........... 358/1.14; 358/471; 358/484; 358/1.9; 358/1.15; 358/1.1; 358/1.16; 713/320; 710/20; 702/62; 700/79

(58) Field of Classification Search
USPC ........ 358/471, 484, 1.14, 1.9, 1.15, 1.1, 1.16; 713/320; 710/20; 702/62; 700/79
See application file for complete search history.

(56) References Cited

U.S. PATENT DOCUMENTS

| | | | | |
|---|---|---|---|---|
| 5,828,568 A | * | 10/1998 | Sunakawa et al. | 700/79 |
| 7,971,083 B2 | * | 6/2011 | Aoki et al. | 713/320 |
| 2004/0057069 A1 | * | 3/2004 | Ikeda | 358/1.14 |
| 2004/0125399 A1 | * | 7/2004 | Kobayashi | 358/1.14 |
| 2007/0201110 A1 | * | 8/2007 | Seki | 358/484 |
| 2007/0236734 A1 | * | 10/2007 | Okamoto | 358/1.16 |
| 2008/0158574 A1 | * | 7/2008 | Sugiyama | 358/1.1 |
| 2009/0051958 A1 | * | 2/2009 | Ito | 358/1.14 |
| 2010/0238484 A1 | * | 9/2010 | Komine | 358/1.15 |
| 2010/0245910 A1 | * | 9/2010 | Maeda | 358/1.15 |
| 2011/0170123 A1 | * | 7/2011 | Ito | 358/1.9 |
| 2011/0235083 A1 | * | 9/2011 | Suzuki | 358/1.14 |
| 2012/0078547 A1 | * | 3/2012 | Murdoch | 702/62 |

FOREIGN PATENT DOCUMENTS

JP 2008-221765 A 9/2008
JP 2011-011387 A 1/2011

* cited by examiner

*Primary Examiner* — Charlotte M Baker
*Assistant Examiner* — Rury Grisham
(74) *Attorney, Agent, or Firm* — Sughrue Mion, PLLC

(57) ABSTRACT

An information processing apparatus includes an execution period specifying unit, a first calculation unit, and a second calculation unit. The execution period specifying unit specifies an execution period of each of plural image processing operations executed by plural image processing apparatuses within a given period of time in the past. The first calculation unit calculates an amount of power estimated to be consumed by a replaceable image processing apparatus executing the plural image processing operations if it is assumed that the plural image processing apparatuses have been replaced by the replaceable image processing apparatus within the given period of time. The second calculation unit calculates a total amount of power estimated to be consumed by the replaceable image processing apparatus if it is assumed that the plural image processing apparatuses have been replaced by the replaceable image processing apparatus within the given period of time.

10 Claims, 8 Drawing Sheets

FIG. 2

| MODEL NAME | SPECIFICATION PARAMETERS | | | | | | | |
|---|---|---|---|---|---|---|---|---|
| | PROCESSING SPEED | FIRST POWER CONSUMPTION (PRINTING-IN-PROGRESS STATE) | SECOND POWER CONSUMPTION (STANDBY STATE) | THIRD POWER CONSUMPTION (LOW-POWER STATE) | FOURTH POWER CONSUMPTION (SLEEP STATE) | FIRST TRANSITION TIME | SECOND TRANSITION TIME | BOOT-UP TIME |
| IMAGE PROCESSING APPARATUS A | 10 PPM | 800 WATTS | 400 WATTS | 100 WATTS | 10 WATTS | 60 SECONDS | 300 SECONDS | 50 SECONDS |
| IMAGE PROCESSING APPARATUS B | 20 PPM | 800 WATTS | 400 WATTS | 100 WATTS | 10 WATTS | 60 SECONDS | 300 SECONDS | 50 SECONDS |
| IMAGE PROCESSING APPARATUS C | 30 PPM | 800 WATTS | 400 WATTS | 100 WATTS | 10 WATTS | 60 SECONDS | 60 SECONDS | 40 SECONDS |
| ... | ... | ... | ... | ... | ... | ... | ... | ... |

FIG. 3A

| JOB NO. | START TIME | END TIME | TIME REQUIRED FOR PRINTING (SECOND) |
|---|---|---|---|
| 77000 | 10:13:15 | 10:18:13 | 298 |
| 77001 | 10:30:45 | 10:39:25 | 520 |
| 77002 | 10:48:06 | 10:55:10 | 424 |
| 77003 | 11:05:17 | 11:10:01 | 284 |
| 77004 | 11:12:55 | 11:15:45 | 170 |
| 77005 | 11:16:34 | 11:18:01 | 87 |
| 77006 | 11:48:51 | 11:55:42 | 411 |
| ... | ... | ... | ... |

FIG. 3B

| JOB NO. | START TIME | END TIME | TIME REQUIRED FOR PRINTING (SECOND) |
|---|---|---|---|
| 42319 | 9:59:07 | 10:05:53 | 406 |
| 42320 | 10:20:24 | 10:28:52 | 508 |
| 42321 | 10:39:27 | 10:45:43 | 376 |
| 42322 | 10:48:04 | 10:50:53 | 169 |
| 42323 | 11:48:38 | 11:53:44 | 306 |
| ... | ... | ... | ... |

FIG. 5A

| JOB NO. | START TIME | END TIME | TIME REQUIRED FOR PRINTING (SECOND) | ESTIMATED TIME REQUIRED FOR PRINTING (SECOND) | ESTIMATED END TIME |
|---|---|---|---|---|---|
| 77000 | 10:13:15 | 10:18:13 | 298 | 99 | 10:14:54 |
| 77001 | 10:30:45 | 10:39:25 | 520 | 173 | 10:33:38 |
| 77002 | 10:48:06 | 10:55:10 | 424 | 141 | 10:50:27 |
| 77003 | 11:05:17 | 11:10:01 | 284 | 95 | 11:06:51 |
| 77004 | 11:12:55 | 11:15:45 | 170 | 57 | 11:13:51 |
| 77005 | 11:16:34 | 11:18:01 | 87 | 29 | 11:17:03 |
| 77006 | 11:48:51 | 11:55:42 | 411 | 137 | 11:51:08 |
| ... | ... | ... | ... | ... | ... |

FIG. 5B

| JOB NO. | START TIME | END TIME | TIME REQUIRED FOR PRINTING (SECOND) | ESTIMATED TIME REQUIRED FOR PRINTING (SECOND) | ESTIMATED END TIME |
|---|---|---|---|---|---|
| 42319 | 9:59:07 | 10:05:53 | 406 | 271 | 10:03:37 |
| 42320 | 10:20:24 | 10:28:52 | 508 | 339 | 10:26:02 |
| 42321 | 10:39:27 | 10:45:43 | 376 | 251 | 10:43:37 |
| 42322 | 10:48:04 | 10:50:53 | 169 | 113 | 10:49:56 |
| 42323 | 11:48:38 | 11:53:44 | 306 | 204 | 11:52:02 |
| ... | ... | ... | ... | ... | ... |

FIG. 6

| JOB NO. | ESTIMATED START TIME | ESTIMATED TIME REQUIRED FOR PRINTING (SECOND) | ESTIMATED END TIME |
|---|---|---|---|
| 42319 | 9:59:07 | 271 | 10:03:37 |
| 77000 | 10:13:15 | 99 | 10:14:54 |
| 42320 | 10:20:24 | 339 | 10:26:02 |
| 77001 | 10:30:45 | 173 | 10:33:38 |
| 42321 | 10:39:27 | 251 | 10:43:37 |
| 42322 | 10:48:04 | 113 | 10:49:56 |
| 77002 | 10:48:06 | 141 | 10:50:27 |
| 77003 | 11:05:17 | 95 | 11:06:51 |
| 77004 | 11:12:55 | 57 | 11:13:51 |
| 77005 | 11:16:34 | 29 | 11:17:03 |
| 42323 | 11:48:38 | 204 | 11:52:02 |
| 77006 | 11:48:51 | 137 | 11:51:08 |
| ... | ... | ... | ... |

FIG. 7

| JOB NO. | ESTIMATED START TIME | ESTIMATED TIME REQUIRED FOR PRINTING (SECOND) | ESTIMATED END TIME |
|---|---|---|---|
| 42319 | 9:59:07 | 271 | 10:03:37 |
| 77000 | 10:13:15 | 99 | 10:14:54 |
| 42320 | 10:20:24 | 339 | 10:26:02 |
| 77001 | 10:30:45 | 173 | 10:33:38 |
| 42321 | 10:39:27 | 251 | 10:43:37 |
| 42322 | 10:48:04 | 113 | 10:49:56 |
| 77002 | *10:49:56* | 141 | *10:52:17* |
| 77003 | 11:05:17 | 95 | 11:06:51 |
| 77004 | 11:12:55 | 57 | 11:13:51 |
| 77005 | 11:16:34 | 29 | 11:17:03 |
| 42323 | 11:48:38 | 204 | 11:52:02 |
| 77006 | *11:52:02* | 137 | *11:54:19* |
| ... | ... | ... | ... |

FIG. 8

| JOB NO. | ESTIMATED START TIME | ESTIMATED TIME REQUIRED FOR PRINTING (SECOND) | ESTIMATED END TIME | NON-EXECUTION TIME (SECOND) |
|---|---|---|---|---|
| 42319 | 9:59:07 | 271 | 10:03:37 | 577 |
| 77000 | 10:13:15 | 99 | 10:14:54 | 330 |
| 42320 | 10:20:24 | 339 | 10:26:02 | 370 |
| 77001 | 10:30:45 | 173 | 10:33:38 | 349 |
| 42321 | 10:39:27 | 251 | 10:43:37 | 266 |
| 42322 | 10:48:04 | 113 | 10:49:56 | 0 |
| 77002 | 10:49:56 | 141 | 10:52:17 | 779 |
| 77003 | 11:05:17 | 95 | 11:06:51 | 363 |
| 77004 | 11:12:55 | 57 | 11:13:51 | 162 |
| 77005 | 11:16:34 | 29 | 11:17:03 | 1895 |
| 42323 | 11:48:38 | 204 | 11:52:02 | 0 |
| 77006 | 11:52:02 | 137 | 11:54:19 | ... |
| ... | ... | ... | ... | ... |

INFORMATION PROCESSING APPARATUS, COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2011-062724 filed Mar. 22, 2011.

BACKGROUND (i) Technical Field

The present invention relates to an information processing apparatus, a computer readable medium storing a program, and an information processing method.

SUMMARY

According to an aspect of the invention, there is provided an information processing apparatus including an execution period specifying unit, a first calculation unit, and a second calculation unit. The execution period specifying unit specifies an execution period of each of plural image processing operations executed by plural image processing apparatuses within a given period of time in the past. The first calculation unit calculates an amount of power estimated to be consumed by a replaceable image processing apparatus executing the plural image processing operations if it is assumed that the plural image processing apparatuses have been replaced by the replaceable image processing apparatus within the given period of time. The calculation of the amount of power is based on a length of each execution period, a preset amount of power consumption of the replaceable image processing apparatus during execution of an image processing operation, a preset processing speed of each of the plural image processing apparatuses, and a preset processing speed of the replaceable image processing apparatus. The second calculation unit calculates a total amount of power estimated to be consumed by the replaceable image processing apparatus if it is assumed that the plural image processing apparatuses have been replaced by the replaceable image processing apparatus within the given period of time. The calculation of the total amount of power is based on the amount of power calculated by the first calculation unit.

BRIEF DESCRIPTION OF THE DRAWINGS

Exemplary embodiment(s) of the present invention will be described in detail based on the following figures, wherein:

FIG. 2 illustrates data stored in a hard disk;

FIG. 3A illustrates history data;

FIG. 3B illustrates history data;

FIG. 5A illustrates history data;

FIG. 5B illustrates history data;

FIG. 6 illustrates merged data;

FIG. 7 illustrates merged data; and

FIG. 8 illustrates merged data.

DETAILED DESCRIPTION

An exemplary embodiment of the present invention will be described in detail hereinafter with reference to the drawings.

Figure 1:
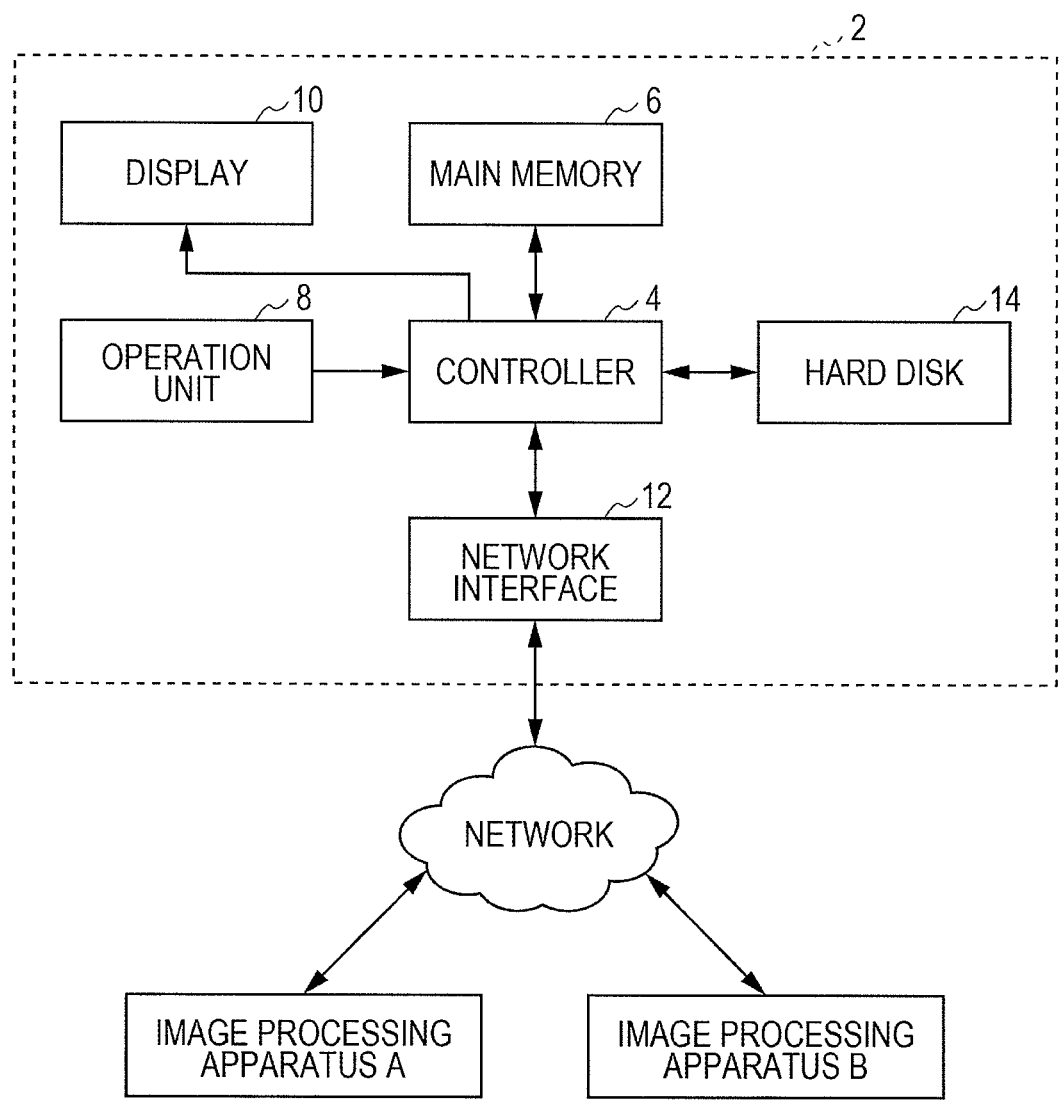
FIG. 1 illustrates the configuration of an information processing apparatus.

FIG. 1 illustrates the configuration of an information processing apparatus 2 according to an exemplary embodiment of the present invention. In this exemplary embodiment, the information processing apparatus 2 may be a server installed in an office of an image processing apparatus manufacturer X, and includes a controller 4, a main memory 6, an operation unit 8, a display 10, a network interface (hereinafter referred to as a "network IF") 12, and a hard disk 14.

The controller 4 may be, for example, a microprocessor, and executes information processing in accordance with a program stored in the main memory 6. The main memory 6 includes a random access memory (RAM) and a read-only memory (ROM). The main memory 6 stores the program described above. The program may be read from a computer-readable information storage medium such as a digital versatile disk (DVD, registered trademark) ROM and stored in the main memory 6, or may be supplied from a communication channel such as a network and stored in the main memory 6. The main memory 6 also stores various types of data necessary during the information processing.

The operation unit 8 may include, for example, a mouse and a keyboard, and outputs information indicating an operation performed by a user to the controller 4. The display 10 may be, for example, a liquid crystal display, and displays information input by using the controller 4.

The network IF 12 may be an interface configured to connect the information processing apparatus 2 to a network, and is configured to receive information from the network or transmit information input by using the controller 4 to the network.

The hard disk 14 is a storage medium configured to store various kinds of information. In this exemplary embodiment, the hard disk 14 stores specification parameters indicating the specifications of image processing apparatuses manufactured by the manufacturer X.

FIG. 2 illustrates exemplary parameters stored in the hard disk 14. As illustrated in FIG. 2, the hard disk 14 stores, in association with each image processing apparatus, specification parameters indicating the specifications of the image processing apparatus. As illustrated in FIG. 2, the specification parameters include "processing speed", "first power consumption", "second power consumption", "third power consumption", "fourth power consumption", "first transition time", "second transition time", and "boot-up time".

The "processing speed" represents the processing speed of an image processing apparatus. In this exemplary embodiment, the "processing speed" represents the number of times an image processing apparatus is capable of performing a printing process operation per minute. The "first power consumption" represents the power consumption per unit time during the printing process operation of an image processing apparatus.

The "second power consumption" represents the power consumption per unit time when an image processing apparatus is in a standby state described below. The "third power consumption" represents the power consumption per unit time when an image processing apparatus is in a low-power state described below. The "fourth power consumption" represents the power consumption per unit time when an image processing apparatus is in a sleep state described below.

The "first transition time", the "second transition time", and the "boot-up time" will be described below.

An image processing apparatus manufactured by the manufacturer X may be an image processing apparatus having a printing function and a copying function using an image forming unit, called a multi-function machine, and executes a printing process operation in response to a request for executing a printing process operation. The image processing apparatus manufactured by the manufacturer X also has a network connection function, and is connected to a network.

The image processing apparatus manufactured by the manufacturer X also has a history recording function, and stores history data indicating the history of the printing process operation executed by the image processing apparatus within a given period of time in the past. In this exemplary embodiment, history data indicating the history of the printing process operation executed by the image processing apparatus within the past 24 hours may be stored.

FIGS. 3A and 3B illustrate history data recorded in an image processing apparatus A and history data recorded in an image processing apparatus B, respectively. The image processing apparatus A and the image processing apparatus B may be owned by a customer company X that is a customer of the manufacturer X. The image processing apparatus A and the image processing apparatus B correspond to "plural image processing apparatuses".

The history data includes plural records. Each record corresponds to one of plural printing process operations executed by the image processing apparatuses. As illustrated in FIGS. 3A and 3B, each record includes "job number", "start time", "end time", and "time required for printing". The "job number" is identification information identifying a printing process operation executed by an image processing apparatus. The "start time" is the time at which the printing process operation starts, and the "end time is the time at which the printing process operation ends. The time required for printing" is the time required for the printing process operation. The "start time" and the "end time define an execution period of the printing process operation. Further, the time required for printing" defines the length of the execution period of the printing process operation.

The image processing apparatus manufactured by the manufacturer X also has an energy saving function, and the operating state of the image processing apparatus may be changed in accordance with the situation. When the printing process operation executed by the image processing apparatus is completed, the operating state of the image processing apparatus is changed to the standby state described above. When the operating state is changed to the standby state, the power consumption per unit time is reduced by one level from the power consumption per unit time during the printing process operation.

If no request for executing a printing process operation is made until the "first transition time" (see FIG. 2) has elapsed since the operating state was changed to the standby state, the operating state is changed to the low-power state described above. If the operating state is changed to the low-power state, the power consumption per unit time is further reduced by one level.

If no request for executing a printing process operation is made until the "second transition time" (see FIG. 2) has elapsed since the operating state was changed to the low-power state, the operating state is also changed to the sleep state (see FIG. 2) described above. If the operating state is changed to the sleep state, the power consumption per unit time is further reduced by one level.

The sleep state corresponds to "a predetermined state", and the sum of the first transition time and the second transition time corresponds to "a predetermined transition time". The first transition time and the second transition time are changeable. That is, the controller 4 (change unit) changes the first transition time or the second transition time when a user performs a predetermined operation.

If a request for executing a printing process operation is made when the operating state of the image processing apparatus is the standby state or the low-power state, the execution of the printing process operation is immediately started. However, if a request for executing a printing process operation is made when the operating state of the image processing apparatus is the sleep state, the "boot-up time" may be required for the image processing apparatus to prepare to execute the printing process operation. Therefore, if a request for executing a printing process operation is made when the operating state of the image processing apparatus is the sleep state, the image processing apparatus starts to execute the printing process operation after the "boot-up time" has elapsed.

The information processing apparatus 2 may be used by, for example, a sales person for the manufacturer X. Specifically, the information processing apparatus 2 has a function for assisting a sales person in proposing that a customer company that owns an image processing apparatus manufactured by the manufacturer X replace a new image processing apparatus. More specifically, the information processing apparatus 2 has a function for estimating power consumption and the like of a new image processing apparatus if the new image processing apparatus replaces plural image processing apparatuses.

The functions of the information processing apparatus 2 will now be described in the context in which a sales person proposes that the customer company X described above replace the image processing apparatus A and the image processing apparatus B with an image processing apparatus C (replaceable image processing apparatus). As illustrated in FIG. 1, the image processing apparatus A and image processing apparatus B that are owned by the customer company X are connected to a network.

Figure 4:
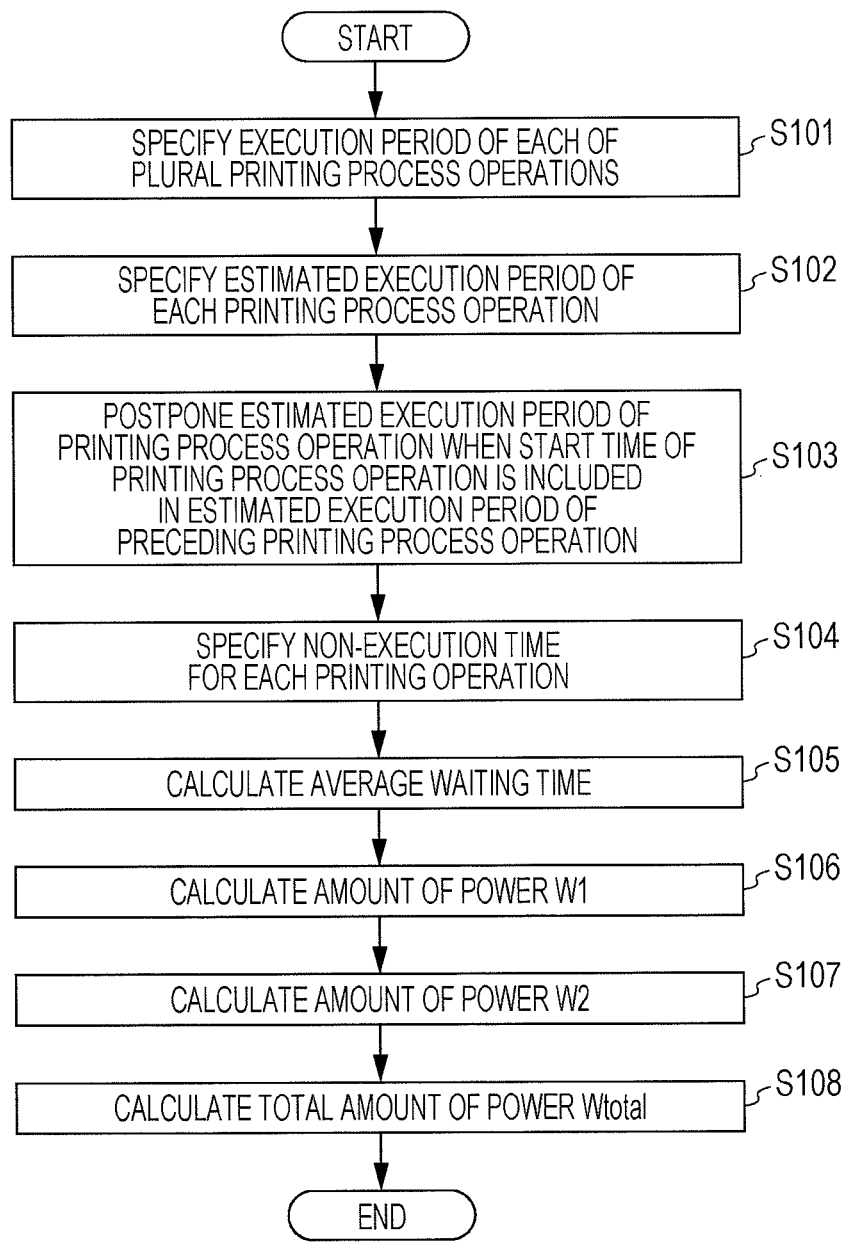
FIG. 4 is a flow diagram illustrating a process executed by a controller.

FIG. 4 is a flow diagram illustrating a process executed by the controller 4 in accordance with the program described above when a sales person performs a predetermined operation, namely, issuing a simulation instruction, using the operation unit 8 (see FIG. 1).

First, the controller 4 (execution period specifying unit) specifies an execution period of each of plural printing process operations executed by the image processing apparatus A and image processing apparatus B owned by the customer company X within the past 24 hours (S101).

In this exemplary embodiment, the controller 4 acquires the history data (hereinafter referred to as "history data A") stored in the image processing apparatus A and the history data (hereinafter referred to as "history data B") stored in the image processing apparatus B. Specifically, the controller 4 receives the history data A from the image processing apparatus A, and receives the history data B from the image processing apparatus B.

Further, the controller 4 (estimated execution period specifying unit, first calculation unit) specifies, for each printing process operation, an estimated execution period of the printing process operation on the basis of the length of the execution period of the printing process operation, the processing speed of the image processing apparatus that has executed the printing process operation, and the processing speed of the image processing apparatus C (S102). Here, the estimated execution period of a printing process operation is a period that is estimated to be a period during which the image processing apparatus C executes the printing process operation when the image processing apparatus A and the image processing apparatus B have been replaced by the image processing apparatus C within the past 24 hours past.

That is, the controller 4 reads the specification parameters for each of the image processing apparatus A, the image processing apparatus B, and the image processing apparatus C.

Then, the controller 4 specifies the estimated execution period of a printing process operation corresponding to each of records included in each piece of history data. For example, the controller 4 may specify the estimated execution period of a printing process operation corresponding to a record included in the history data A by calculating an "estimated time required for printing", which is equal to the product of the "time required for printing" included in the record and the ratio of the "processing speed" of the image processing apparatus A to the "processing speed" of the image processing apparatus C, and by specifying the time at which the "estimated time required for printing" has elapsed since the "start time" included in the record as an "estimated end time". Then, the "estimated time required for printing" and the "estimated end time" are included in the record. The period from the "start time" included in the record to the "estimated end time" represents the estimated execution period of the printing process operation corresponding to the record. Further, the "estimated time required for printing" included in the record represents the length of the estimated execution period of the printing process operation.

Additionally, for example, the controller 4 may specify the estimated execution period of a printing process operation corresponding to a record included in the history data B by calculating an "estimated time required for printing", which is equal to the product of the time "required for printing" included in the record and the ratio of the "processing speed" of the image processing apparatus B to the "processing speed" of the image processing apparatus C, and by specifying the time at which the "estimated time required for printing" has elapsed since the "start time" included in the record as an "estimated end time". Then, the "estimated time required for printing" and the "estimated end time" are included in the record.

FIG. 5A illustrates the history data A obtained immediately after the processing of step S102 is executed, and FIG. 5B illustrates the history data B obtained immediately after the processing of step S102 is executed.

Subsequently, the controller 4 (postponement unit) postpones the estimated execution period of each printing process operation if the start time of the printing process operation is included in the estimated execution period of the preceding printing process operation (S103).

In this exemplary embodiment, first, the controller 4 merges the history data A with the history data B to generate merged data. In this exemplary embodiment, the "end time" and the "time required for printing" are deleted from both the history data A and the history data B before the history data A and the history data B are merged. In this case, the "start time" is changed to the "estimated start time" representing the start time of the estimated execution period. FIG. 6 illustrates merged data. As illustrated in FIG. 6, a record that includes an earlier "estimated start time" is stored at a higher position in the merged data.

Then, the controller 4 specifies a record (hereinafter referred to as a "specific record") among the records included in the merged data (see FIG. 6) whose "estimated start time" is earlier than the "estimated end time" in the record above. For example, in the merged data illustrated in FIG. 6, the record including job number "770002" and the record including job number "77006" may be specified as specific records.

Then, the controller 4 updates the "estimated start time" included in a specific record to the same time as the "estimated end time" included in the record above the specific record, and updates the "estimated end time" to the time at which the "estimated time required for printing" has elapsed since the updated "estimated start time". FIG. 7 illustrates merged data obtained immediately after the processing of step S103 is executed.

Accordingly, the estimated execution periods of the individual printing process operations are determined. Then, the controller 4 (time specifying unit) specifies, for each printing process operation, the time (hereinafter referred to as a "non-execution time") from the end time of the estimated execution period of the printing process operation to the start time of the estimated execution period of the printing process operation subsequent to the printing process operation (S104).

That is, the controller 4 calculates, for each record included in merged data, the time from the "estimated end time" included in the record to the "estimated start time" included in the record below the record as the "non-execution time", and includes the "non-execution time" in the record.

FIG. 8 illustrates merged data obtained after the processing of step S104 is executed.

Then, the controller 4 (fourth calculation unit) calculates, for each of 24 unit periods obtained by equally dividing the period of the past 24 hours into 24 segments, the average waiting time of the employees of the customer company X if it is assumed that the image processing apparatus A and the image processing apparatus B have been replaced by the image processing apparatus C within the unit period (S105). Here, the controller 4 may calculate an average waiting time $Tw$ of the employees during a unit period P by performing the calculation of the queue represented using Kendall's notation M/M/1 by using the image processing apparatus C as a window. The controller 4 performs the calculation of the queue on the basis of a service time T that is each of times within an estimated execution period included in the unit period P, the number of estimated execution periods C that are included in the unit period P, a lead time $Ta$ that may be required for the image processing apparatus C whose operating state is the sleep state to prepare to execute a printing process operation, a time $t1$ in the unit period P, and a time $t2$ taken from when the image processing apparatus C completes the execution of the printing process operation to when the operating state of the image processing apparatus C is changed to the sleep state.

Here, an "estimated time required for printing" included in each of records (hereinafter referred to as "records of interest") including both the "estimated start time" in the unit period P and the "estimated end time" in the unit period P is used as each service time T. Further, the number of records of interest is used as the number of estimated execution periods C. Further, the "boot-up time" included in the specification parameters of the image processing apparatus C is used as the lead time $Ta$. Moreover, a time of 3600 seconds is used as the time $t1$. Moreover, the sum of the "first transition time" and the "second transition time" included in the specification parameters of the image processing apparatus C is used as the time $t2$.

The average waiting time $Tw$ is represented as the sum of the product of a queue length L of the queue and an average service time $Ts$ that is the average of the service times T and the product of the queue length L and an expected value $Tx$ of the lead time $Ta$. That is, the average waiting time $Tw$ is represented using the following equation:

$$Tw = L \times (Ts + Tx),$$

where the queue length L of the queue is calculated on the basis of the service times T and the time $t1$. That is, the queue length L of the queue is represented as below using window utilization ρ (ρ=(sum of T)/t1):

$$L=\rho/(1-\rho).$$

The expected value Tx is calculated on the basis of the service times T, the number of estimated execution periods C, the time t1, the lead time Ta, and the time t2. Specifically, the expected value Tx is represented as below using the lead time Ta and the probability function F(Tz, t2):

$$Tx=Ta \times F(Tz, t2).$$

The probability function F(Tz, t2) represents the "probability that a request for executing a printing process operation is made when the operating state of an image processing apparatus C is the sleep state if it is assumed that the image processing apparatus A and the image processing apparatus B have been replaced by the image processing apparatus C within the unit period P".

In the above equation, Tz denotes the average idle time determined by dividing the value obtained by subtracting the sum of the service times T from the time t1 by the number of estimated execution periods C.

If the average idle time Tz is equal to the time t2 from when the image processing apparatus C completes the execution of a printing process operation to when the operating state of the image processing apparatus C is changed to the sleep state, the "probability that the idle time from the completion of a printing process operation to the start of the next printing process operation is shorter than the time t2 if it is assumed that the image processing apparatus A and the image processing apparatus B have been replaced by the image processing apparatus C within the unit period P" and the "probability that the idle time is greater than or equal to the time t2 if it is assumed that the image processing apparatus A and the image processing apparatus B have been replaced by the image processing apparatus C within the unit period P" may be reduced by half.

Therefore, F(Tz, t2) is set to have a value of 0.5 or approximately 0.5 when the average idle time Tz is equal to the time t2.

Further, if the average idle time Tz is shorter than the time t2, the "probability that the idle time is less than the time t2 if it is assumed that the image processing apparatus A and the image processing apparatus B have been replaced by the image processing apparatus C within the unit period P" may be lower than the "probability that the idle time is greater than or equal to the time t2 if it is assumed that the image processing apparatus A and the image processing apparatus B have been replaced by the image processing apparatus C within the unit period P".

Therefore, F(Tz, t2) is set to have a value less than 0.5 or approximately 0.5 when the average idle time Tz is shorter than the time t2. In this exemplary embodiment, F(Tz, t2) may be represented as follows:

$$F(Tz, t2)=1-\text{MIN}(1, t2/Tz/2).$$

After the average waiting time Tw is calculated in the manner described above, in steps S106 to S108, the controller 4 calculates the total amount of power $W_{total}$ estimated to be consumed by the image processing apparatus C if it is assumed that the image processing apparatus A and the image processing apparatus B have been replaced by the image processing apparatus C within the past 24 hours.

That is, the controller 4 (first calculation unit) calculates an amount of power W1 estimated to be consumed by executing, by the image processing apparatus C, plural printing process operations executed by the image processing apparatus A and the image processing apparatus B within the past 24 hours if it is assumed that the image processing apparatus A and the image processing apparatus B have been replaced by the image processing apparatus C within the past 24 hours, on the basis of the "estimated time required for printing" included in each record and the "first power consumption" included in the specification parameters of the image processing apparatus C (S106).

That is, the controller 4 calculates, for each record, an amount of power consumed by executing, by the image processing apparatus C, the printing process operation corresponding to the record, by computing the product of the "estimated time required for printing" included in the record and the "first power consumption" included in the specification parameters of the image processing apparatus C. Then, the controller 4 calculates the sum of the respective amounts of power to calculate the amount of power W1.

Here, the "boot-up time", which is a fixed value, is used as the lead time Ta. In actuality, however, the boot-up time may not necessarily be fixed. For example, in an image processing apparatus that performs printing based on xerography, the time required until a fuser that fuses an image forming material (such as toner) transferred onto an image forming medium (such as printing paper) and that fixes the image forming material onto the image forming medium has reached a predetermined temperature depends upon the temperature of the fuser and the like when the boot-up operation of the image processing apparatus is started, and the "boot-up time" depends on the time required until the fuser has reached the predetermined temperature. Therefore, for example, Ta may be used as a function in which the average elapsed time since the transition to the sleep state is a variable.

Subsequently, the controller 4 (third calculation unit) calculates an amount of power W2 estimated to be consumed during non-execution of a printing process operation of the image processing apparatus C if it is assumed that the image processing apparatus A and the image processing apparatus B have been replaced by the image processing apparatus C within the past 24 hours, on the basis of the "non-execution time" included in each record and on the basis of the "second power consumption", "third power consumption", and "fourth power consumption" included in the specification parameters of the image processing apparatus C (S107).

That is, the controller 4 calculates, for each record, an amount of power consumed during a period from when the printing process operation corresponding to the record is executed to when the printing process operation corresponding to the record below the record is executed, on the basis of the "non-execution time" included in the record and on the basis of the "second power consumption", "third power consumption", and "fourth power consumption" included in the specification parameters of the image processing apparatus C. That is, if the "non-execution time" is less than or equal to the "first transition time" (reference time) included in the specification parameters of the image processing apparatus C, the controller 4 calculates the product of the "non-execution time" and the "second power consumption". If the "non-execution time" is longer than the "first transition time" and is less than or equal to the sum of the "first transition time" and the "second transition time" (reference time), the controller 4 calculates the sum of the product of the "first transition time" and the "second power consumption" and the product of the "third power consumption" and the value obtained by subtracting the "first transition time" from the "non-execution time". Further, if the "non-execution" time is longer than the sum of the "first transition time" and the "second transition time", the controller 4 calculates the sum of the product of the "first transition time" and the "second power consumption", the product of the "second transition time" and the "third power consumption", and the product of the "fourth power consumption" and the value obtained by subtracting the "first transition time" and the "second transition time" from the "non-execution time".

Then, the controller 4 calculates the sum of the respective amounts of power to calculate an amount of power W2.

After the amount of power W1 and the amount of power W2 are calculated in the manner described above, the controller (second calculation unit) calculates the total amount of power $W_{total}$ on the basis of the amount of power W1 and the amount of power W2 (S108). That is, the controller 4 calculates the sum of the amount of power W1 and the amount of power W2.

Further, the controller 4 calculates the power consumption of the image processing apparatus A within the past 24 hours by performing processing similar to that of steps S106 to S108, on the basis of the "time required for printing" included in each record of the history data A and on the basis of the "first power consumption", "second power consumption", "third power consumption", and "fourth power consumption" included in the specification parameters of the image processing apparatus A. The controller 4 further calculates the power consumption of the image processing apparatus B within the past 24 hours by performing processing similar to that of steps S106 to S108, on the basis of the "time required for printing" included in each record of the history data B and on the basis of the "first power consumption", "second power consumption", "third power consumption", and "fourth power consumption" included in the specification parameters of the image processing apparatus B. Then, the controller 4 calculates the total amount of power consumed by the image processing apparatus A and the image processing apparatus B within the past 24 hours, on the basis of the calculated two amounts of power consumption. On the basis of the total amount of power and the total amount of power $W_{total}$, a sales person proposes that the customer company X replace the image processing apparatus C.

Further, the controller 4 calculates the average waiting time for the image processing apparatus A per unit period by performing processing similar to that of steps S104 and S105 on the basis of the history data A and the specification parameters of the image processing apparatus A. The controller 4 also calculates the average waiting time for the image processing apparatus B per unit period by performing processing similar to that of steps S104 and S105 on the basis of the history data B and the specification parameters of the image processing apparatus B. On the basis of the individual average waiting times for the image processing apparatus A, the image processing apparatus B, and the image processing apparatus C, the sales person proposes that the customer company X replace the image processing apparatus C.

Exemplary embodiments of the present invention are not limited to the foregoing exemplary embodiment.

For example, in the foregoing exemplary embodiment, a portion of the period of the past 24 hours is a unit period. However, the entire period of the past 24 hours may be a unit period.

In addition, the history data A and the history data B may be stored in the hard disk 14 (see FIG. 1). In this case, in step S101, the controller 4 may read the history data A and the history data B from the hard disk 14.

In addition, the controller 4 (postponement unit) may postpone the estimated execution period of a printing process operation if the period of time between the estimated start time of the printing process operation and the estimated end time of the estimated execution period of the preceding printing process operation is greater than or equal to the sum of the first transition time and the second transition time and is less than the sum of the first transition time, the second transition time, and the boot-up time. In this case, for example, the controller 4 may postpone the estimated execution period of a printing process operation so that the period of time between the estimated start time of the estimated execution period and the estimated end time of the estimated execution period of the preceding printing process operation may be made equal to the sum of the first transition time, the second transition time, and the boot-up time.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an execution period specifying unit configured to specify an execution period of each of a plurality of image processing operations executed by a plurality of image processing apparatuses within a given period of time in the past;
a first calculation unit configured to calculate, using a first assumption that the plurality of age processing apparatuses have been replaced by a replacement image processing apparatus, an amount of power estimated to be consumed by the replacement image processing apparatus executing the plurality of image processing operations during, the given period of time, the calculation of the amount of power being based on a length of each execution period, a preset amount of power consumption of the replacement image processing apparatus during execution of an image processing operation, a preset processing speed of each of the plurality of image processing apparatuses, and a preset processing speed of the replacement image processing apparatus; and
a second calculation unit configured to calculate, using the first assumption and based on the amount of power calculated by the first calculation unit, a total amount of power estimated to be consumed by the replacement image processing apparatus during the given period of time.

2. The information processing apparatus according to claim 1, further comprising:
an estimated execution period specifying unit configured to specify, using the first assumption and for each of the plurality of image processing operations, an estimated execution period that is estimated to be a period during which the replacement image processing apparatus executes the image processing operation during the given period of time, the estimated execution period being specified based on a length of an execution period of the image processing operation, a processing speed of an image processing apparatus that has performed the image processing operation, and the processing speed of the replacement image processing apparatus;

a time specifying unit configured to specify, for each of the plurality of image processing operations, a length of time from a first time at which an estimated execution period of the image processing operation ends to a second time at which an estimated execution period of an image processing operation subsequent to the image processing operation starts; and a third calculation unit configured to calculate, using the first assumption, an amount of power estimated to be consumed by the replacement image processing apparatus during a period of time during which no image processing operations are executed within the given period of time, the calculation of the amount of power being based on the length of time specified by the time specifying unit and a preset amount of power consumption of the replacement image processing apparatus during the period of time during which no image processing operations are executed, wherein the second calculation further configured to calculate the total amount of power, based on the amount of power calculated by the first calculation unit and the amount of power calculated by the third calculation unit.

3. The information processing apparatus according to claim 2, further comprising:

a postponement unit configured to postpone, in response to a time at which a first estimated execution period starts being included in the second estimated execution period, the first estimated execution period so that a time at which the first estimated execution period starts matches a time at which a second estimated execution period ends, the first estimated execution period being an estimated execution period of a first image processing operation included in the plurality of image processing operations, the second estimated execution period being an estimated execution period of a second image processing operation included in the plurality of image processing operations and preceding the first image processing operation, wherein in response to the first estimated execution period being postponed, the time specifying unit specifies, for the first estimated execution period, a length of time from a time at which the first estimated execution period postponed by the postponement unit ends to a time at which an estimated execution period of an image processing operation included in the plurality of image processing operations and subsequent to the first image processing operation starts.

4. The information processing apparatus according to claim 2, wherein the third calculation unit is further configured to calculate, using the first assumption, an amount of power estimated to be consumed by the replaceable image processing apparatus during the period of time during which no image processing operations are executed within the given period of time, by switching a value to be used as the amount of power consumption in accordance with whether or not the time specified by the time specifying unit is less than or equal to a reference time, and wherein the information processing apparatus further comprises a change unit configured to change the reference time.

5. The information processing apparatus according to claim 2, wherein the replacement image processing apparatus is configured to enter a predetermined state after a predetermined transition time has elapsed since completion of execution of an image processing operation, wherein the information processing apparatus further comprises a fourth calculation unit configured to calculate an average waiting time of a user of the replaceable image processing apparatus by performing calculation of a queue represented using Kendall's notation M/M/1 by using the replacement image processing apparatus as a window, the calculation of the average waiting time being based on a service time that is a time of the estimated execution period within a unit period that is a period of at least a unit time within the given period of time, the number of estimated execution periods within the unit period, a lead time for the replacement image processing apparatus that is in the predetermined state to prepare to execute an image processing operation, the unit time, and the transition time, and wherein the average waiting time of the user is equal to a sum of a product of a queue length of the queue calculated based on the service time and the unit time and an average service time that is an average of service times and a product of an expected lead time and the queue length, the expected lead time being calculated based on the service time, the number of estimated execution periods, the unit time, the lead time, and the transition time.

6. The information processing apparatus according to claim 5, wherein the predetermined state is a sleep state, and the expected lead time is equal to a product of the lead time and a function value of a function in which an average idle time and the transition time are variables, the average idle time being obtained by dividing a difference obtained by subtracting a sum of service times from the unit time by the number of estimated execution periods.

7. The information processing apparatus according to claim 6, wherein in response to the average idle time being equal to the transition time, the function is set to have a function value of approximately 0.5.

8. The information processing apparatus according to claim 7, wherein in response to the transition time being longer than the average idle time, the function is set to have a function value less than approximately 0.5.

9. A non-transitory computer readable medium storing a program causing a computer to execute a process, the process comprising:

specifying an execution period of each of a plurality of image processing operations executed by a plurality of image processing apparatuses within a given period of time in the past;

calculating, using a first assumption that the plurality of image processing apparatuses have been replaced by a replacement image processing apparatus, an amount of power estimated to be consumed by the replacement image processing apparatus executing the plurality of image processing operations during the given period of time, the calculation of the amount of power being based on a length of each execution period, a preset amount of power consumption of the replacement image processing apparatus during execution of an image processing operation, a preset processing speed of each of the plurality of image processing apparatuses, and a preset processing speed of the replacement image processing apparatus; and calculating, using the first assumption and based on the calculated amount of power, a total amount of power estimated to be consumed by the replacement image processing apparatus during the given period of time.

10. An information processing method comprising:
  specifying an execution period of each of a plurality of image processing operations executed by a plurality of image processing apparatuses within a given period of time in the past;
  calculating, using a processor and a first assumption that the plurality of image processing apparatuses have been replaced by a replacement image processing apparatus, an amount of power estimated to be consumed by the replacement image processing apparatus executing the plurality of image processing operations during the given period of time, the calculation of the amount of power being based on a length of each execution period, a preset amount of power consumption of the replacement image processing apparatus during execution of an image processing operation, a preset processing speed of each of the plurality of image processing apparatuses, and a preset processing speed of the replacement image processing apparatus; and
  calculating, using the first assumption and based on the calculated amount of power, a total amount of power estimated to be consumed by the replacement image processing apparatus during the given period of time.

\* \* \* \* \*